(12) United States Patent
Liu

(10) Patent No.: US 11,048,535 B2
(45) Date of Patent: Jun. 29, 2021

(54) METHOD AND APPARATUS FOR TRANSMITTING DATA PACKET BASED ON VIRTUAL MACHINE

(71) Applicant: TENCENT TECHNOLOGY (SHENZHEN) COMPANY LIMITED, Guangdong (CN)

(72) Inventor: Hua Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 82 days.

(21) Appl. No.: 16/359,036

(22) Filed: Mar. 20, 2019

(65) Prior Publication Data
US 2019/0220296 A1 Jul. 18, 2019

Related U.S. Application Data

(63) Continuation of application No. PCT/CN2017/116898, filed on Dec. 18, 2017.

(30) Foreign Application Priority Data

Dec. 21, 2016 (CN) .......................... 201611190729.5

(51) Int. Cl.
*G06F 9/46* (2006.01)
*G06F 9/455* (2018.01)
(Continued)

(52) U.S. Cl.
CPC .......... *G06F 9/45533* (2013.01); *H04L 12/66* (2013.01); *H04L 61/2007* (2013.01);
(Continued)

(58) Field of Classification Search
CPC . G06F 9/45533; H04L 12/66; H04L 61/2007; H04L 61/2592
See application file for complete search history.

(56) References Cited

U.S. PATENT DOCUMENTS 8,856,407 B2 * 10/2014 de Goede ............. G06F 13/105
710/53
2002/0147826 A1 * 10/2002 Sultan ................... H04L 47/193
709/230
(Continued)

FOREIGN PATENT DOCUMENTS

CN          101557420 A      10/2009
CN          102291428 A      12/2011
(Continued)

OTHER PUBLICATIONS

International Search Report for PCT/CN2017/116898, dated Mar. 15, 2018.

*Primary Examiner* — Camquy Truong
(74) *Attorney, Agent, or Firm* — Sughrue Mion, PLLC

(57) ABSTRACT

A method for transmitting a data packet based on a virtual machine is provided. A direct through-connection is established between the virtual machine and a network interface card. A data packet transmitted by a driver layer of the virtual machine is detected. An encapsulation parameter obtaining request is transmitted to a virtual machine monitor corresponding to the virtual machine, and encapsulation information and an encapsulation parameter are received in response to the encapsulation parameter obtaining request. The data packet is encapsulated according to the encapsulation information and the encapsulation parameter, and the encapsulated data packet is added to a hardware transmitting queue of the network interface card by using the direct through-connection to transmit the encapsulated data packet.

17 Claims, 6 Drawing Sheets

(51) Int. Cl.
*H04L 29/12* (2006.01)
*H04L 12/66* (2006.01)

(52) U.S. Cl.
CPC .............. *H04L 61/2592* (2013.01); *G06F 2009/45579* (2013.01); *G06F 2009/45595* (2013.01); *H04L 61/2038* (2013.01); *H04L 61/6022* (2013.01)

(56) References Cited

U.S. PATENT DOCUMENTS

| | | | | |
|---|---|---|---|---|
| 2005/0195809 | A1* | 9/2005 | Zanaty | H04L 12/66 370/389 |
| 2013/0167152 | A1* | 6/2013 | Jeong | G06F 9/4881 718/102 |
| 2016/0170782 | A1 | 6/2016 | Klein et al. | |

FOREIGN PATENT DOCUMENTS

| | | | |
|---|---|---|---|
| CN | 102609298 | A | 7/2012 |
| CN | 103200085 | A | 7/2013 |
| CN | 103473136 | A | 12/2013 |

\* cited by examiner

METHOD AND APPARATUS FOR TRANSMITTING DATA PACKET BASED ON VIRTUAL MACHINE

CROSS-REFERENCE TO RELATED APPLICATIONS

This application is a continuation of International Application No. PCT/CN2017/116898, filed on Dec. 18, 2017, which claims priority from Chinese Patent Application No. 201611190729.5, filed on Dec. 21, 2016, in the Chinese Patent Office, of which disclosures are incorporated herein by reference in their entireties.

BACKGROUND

1. Field

Apparatuses and methods consistent with exemplary embodiments relate to the field of computer technologies, and in particular, to a method and an apparatus for sending a data packet based on a virtual machine, a method and an apparatus for receiving a data packet based on a virtual machine, a network device and a storage medium.

2. Description of the Related Art

With generation and development of virtualization technologies, a user may simulate one or more virtual machines (or referred to as "VM") on one physical server (a physical host may be used as a host of two or more virtual machines). The so-called virtual machine is a complete computer system that has a complete hardware system function by means of software simulation and that runs in a completely isolated environment. These virtual machine systems operate similarly to real computers. For example, an operating system and an application program may be installed in the virtual machine system, and the virtual machine system may access a network resource. After a user creates a virtual machine, to enable the virtual machine to receive/transmit data like a physical host, the user needs to establish a virtual network and allocate an Internet Protocol (IP) address to the virtual machine, so as to send data or receive data according to the IP address.

Because a virtual machine is a virtual module on a physical host, that is, the virtual machine has no physical network interface card or network interface card device, the virtual machine needs to send data or receive data through a network interface card device on the corresponding host. Optionally, for example, a back-end driver is installed on a host side, a front-end driver is installed on a virtual machine side, and the back-end driver of the host directly interacts with hardware of a network interface card on the host, to optionally receive/transmit a data packet. However, the front-end driver of the virtual machine does not directly interact with hardware of the network interface card, but interacts with the back-end driver on the host side, thereby indirectly completing interaction with the network interface card. That is, each data packet sent to the virtual machine or each data packet sent by the virtual machine passes through the back-end driver on the host side, and then on the host side, a network IP virtualization operation such as encapsulation/decapsulation of the data packet is performed on network communication of the virtual machine.

Based on the foregoing technology in the related art, a plurality of virtual machines is disposed on one physical host. However, it may occur that a network interface card of the physical host still has a large quantity of idle bandwidth, but a data receiving/transmitting speed of a virtual machine is very low, and the physical host consumes a large quantity of CPU resources and has a large load.

For the physical host, the foregoing method of sending a data packet based on a virtual machine has a problem that a processing capability of the network interface card cannot be fully used and central processing unit (CPU) resources are excessively consumed, that is, effective utilization on system resources is not achieved.

SUMMARY

One or more exemplary embodiments provide a method and an apparatus for sending a data packet based on a virtual machine, and a method and an apparatus for receiving a data packet based on a virtual machine, a network device and a storage medium, to at least partially solve the foregoing problem that effective utilization of a processing capability of a network is low and/or a large quantity of central processing unit (CPU) resources are consumed.

According to an aspect of an exemplary embodiment, provided is a method for transmitting a data packet based on a virtual machine. A direct through-connection is established between the virtual machine and a network interface card. A data packet transmitted by a driver layer of the virtual machine is detected. An encapsulation parameter obtaining request is transmitted to a virtual machine monitor corresponding to the virtual machine, and encapsulation information and an encapsulation parameter are received in response to the encapsulation parameter obtaining request. The data packet is encapsulated according to the encapsulation information and the encapsulation parameter, and the encapsulated data packet is added to a hardware transmitting queue of the network interface card by using the direct through-connection to transmit the encapsulated data packet.

According to an aspect of another exemplary embodiment, provided is an apparatus for transmitting a data packet based on a virtual machine, the apparatus including: at least one memory configured to store program code; and at least one processor configured to access the at least one memory and operate according to the program code. The program code includes: direct through-connection establishment code configured to cause the at least one processor to establish a direct through-connection between the virtual machine and a network interface card; data packet detection code configured to cause the at least one processor to detect a data packet sent by a driver layer of the virtual machine; encapsulation parameter obtaining code configured to cause the at least one processor to transmit an encapsulation parameter obtaining request to a virtual machine monitor corresponding to the virtual machine, and receive encapsulation information and an encapsulation parameter in response to the encapsulation parameter obtaining request; and encapsulation code configured to cause the at least one processor to encapsulate the data packet according to the encapsulation information and the encapsulation parameter, and add the encapsulated data packet to a hardware transmitting queue of the network interface card by using the direct through-connection to transmit the encapsulated data packet.

According to an aspect of another exemplary embodiment, provided is a method for receiving a data packet based on a virtual machine. A direct through-connection between the virtual machine and a network interface card is established. A data packet in a hardware receiving queue of the network interface card is obtained. A decapsulation parameter obtaining request is transmitted to a virtual machine monitor corresponding to the virtual machine, and decapsulation information and a decapsulation parameter are obtained in response to the decapsulation parameter obtaining request. The obtained data packet is decapsulated according to the decapsulation information and the decapsulation parameter, and the decapsulated data packet is transmitted to a driver layer of the virtual machine.

According to an aspect of another exemplary embodiment, provided is apparatus for receiving a data packet based on a virtual machine, the apparatus including at least one memory configured to store program code, and at least one processor configured to access the at least one memory and operate according to the program code. The program code includes: direct through-connection establishment code configured to cause the at least one processor to establish a direct through-connection between a virtual machine and a network interface card; data packet obtaining code configured to cause the at least one processor to obtain a data packet in a hardware receiving queue of the network interface card; decapsulation parameter obtaining code configured to cause the at least one processor to transmit a decapsulation parameter obtaining request to a virtual machine monitor corresponding to the virtual machine, and obtain decapsulation information and a decapsulation parameter in response to the decapsulation parameter obtaining request; and decapsulation code configured to cause the at least one processor to decapsulate the obtained data packet according to the decapsulation information and the decapsulation parameter, and transmit the decapsulated data packet to a driver layer of the virtual machine.

According to an aspect of another exemplary embodiment, provided is a non-transitory computer storage medium, the computer storage medium storing computer executable code, and after being executed, the computer executable code being capable of implementing the method for transmitting a data packet based on a virtual machine provided in the foregoing one or more technical solutions, or implementing the method for receiving a data packet based on a virtual machine provided in the foregoing one or more technical solutions.

In the exemplary embodiments, after the foregoing method and apparatus for sending data based on a virtual machine and the foregoing method and apparatus for receiving data based on a virtual machine are used, a virtual machine on a physical host establishes a direct through-connection between the virtual machine and a network interface card, the virtual machine directly sends and receives data by using the direct through-connection between the virtual machine and the network interface card, and data does not need to be relayed through a network interface card driver on the host. In a process of sending data, virtual machine needs to request, from a virtual machine monitor on the host, a data packet encapsulation parameter corresponding to the data that needs to be sent, then encapsulates, according to the encapsulation parameter provided by the virtual machine monitor on the host, data that needs to be encapsulated, and then sends the encapsulated data to the network interface card for sending. When the network interface card in the direct through-connection to the virtual machine receives the encapsulated data, the network interface card also needs to request a decapsulation parameter from the virtual machine monitor on the host after, then can decapsulate the received data according to the decapsulation parameter provided the virtual machine monitor, and then can send the data to a driver layer of the virtual machine. That is, after the direct through-connection between the virtual machine side and the network interface card is established, the virtual machine side may complete encapsulation and decapsulation on the data packet, but a policy for the virtual machine side to encapsulate and decapsulate the data packet is still completed by the host side. That is, a control plane and a data plane for receiving/transmitting the data packet are separated, and sending and receiving of data thereof are transparent for the virtual machine.

Therefore, according to an exemplary embodiment, for the physical host, in a process in which the virtual machine sends or receives a data packet, the network interface card driver of the host side does not need to perform a plurality of times of data transmission and data packet encapsulation and decapsulation, to reduce occupancy for a system resource, particularly, a resource such as a central processing unit (CPU) resource or a memory resource, thereby reducing consumption of a resource such as a CPU resource and a memory resource, and reducing a load ratio of a CPU.

Also, according to an exemplary embodiment, a resource such as a CPU resource and a memory resource does not become a bottleneck of using the network interface card of the physical host anymore, so that a bandwidth use rate of the network interface card on the physical host may be higher, thereby improving an effective use rate of the network interface card on the physical host.

Further, according to an exemplary embodiment, a problem that an excessively large quantity of CPU resources and memory resources are occupied, causing a large delay of data exchange between the virtual machine and a peripheral and a low receiving/transmitting speed is also reduced, so as to improve a rate of data exchange between the virtual machine and the peripheral, and improve a data transmission speed.

BRIEF DESCRIPTION OF THE DRAWINGS

These and/or other aspects of the disclosure will become apparent and more readily appreciated from the following description of the exemplary embodiments, taken in conjunction with the accompanying drawings, in which.

DETAILED DESCRIPTION

The following clearly and completely describes the technical solutions in the embodiments with reference to the accompanying drawings in the embodiments. Obviously, the described embodiments are only some embodiments instead of all possible embodiments of the disclosure. All other embodiments obtainable by a person of ordinary skill in the art based on the embodiments without creative efforts shall fall within the protection scope of the disclosure.

It is found through research that, in a process in which a virtual machine sends and receives a data packet, sending or receiving of all data packets requires a plurality of operations such as data transmission between the back-end driver of the host side and the front-end driver of the virtual machine side, and encapsulation or decapsulation on a data packet by the back-end driver of the host side, and sending or receiving of one data packet needs to be completed through data transmission and data processing between a plurality of modules. In this way, the back-end driver of the host side needs to consume a central processing unit (CPU) processing resource. Particularly, when a physical network interface card of a computer has a relatively strong processing capability and a relatively large network throughput, a calculation quantity of receiving and sending a data packet based on a virtual machine is greatly increased, causing sharply increased CPU consumption and a high CPU load ratio. A CPU is a bottleneck of receiving/transmitting data between a virtual machine and an external device, causing problems such as a large data receiving/transmitting delay and ineffective use of bandwidth resources of the network interface card.

In view of this, exemplary embodiments provide a method for transmitting a data packet based on a virtual machine and a method for receiving a data packet based on a virtual machine. The methods may be implemented based on a computer program, the computer program may be run on a computer system based on the Von Neumann architecture, and the computer program may be a data receiving/transmitting management application program based on a virtual machine or a virtual machine management program. The computer system may be a server or terminal such as, for example but not limited to, a smartphone, a tablet computer, or a personal computer on which the computer program is run.

Figure 1:
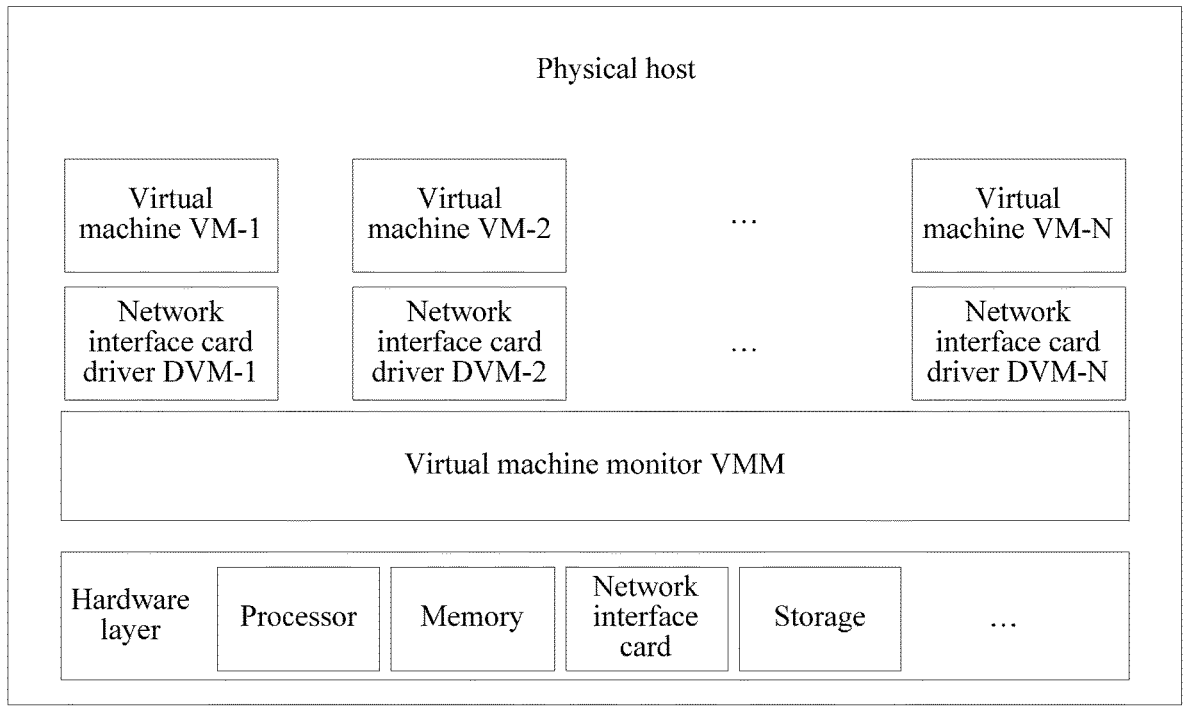
FIG. 1 is a schematic diagram of a logical structure of a computer device including a plurality of virtual machines according to an embodiment.

FIG. 1 illustrates a schematic diagram of a logical structure of a computer system according to an embodiment. As shown in FIG. 1, a physical host includes N virtual machines such as VM-1, . . . , and VM-N, and for each virtual machine VM-i, a corresponding network interface card driver, that is, DVM-i is installed in the computer system corresponding to each virtual machine VM-i. A value of i is less than N, and both N and i are positive integers. For a virtual machine, when the virtual machine sends data or another virtual machine or device sends data, the data needs to be received and sent by using a network interface card driver installed the virtual machine.

As shown in FIG. 1, the physical host further includes a virtual machine monitor (hereinafter, also referred to as "VMM"). Optionally, in an exemplary embodiment, the VMM is system software, used to create and manage a virtual machine on the physical host, and dynamically manage a virtual resource. That is, the virtual machine monitor VMM is a virtual machine management program installed on the physical host, and may be configured to present a virtual hardware platform to a virtual machine, and schedule and isolate a virtual machine. The virtual hardware platform provides various hardware resources to each virtual machine run on the virtual hardware platform, for example, provides a virtual CPU, a memory, a virtual disk, a virtual network interface card and the like.

Optionally, in an exemplary embodiment, a method for sending a data packet based on a virtual machine is based on an overlay network technology, for example, a VXLAN (virtual extensible local area network (LAN)) technology. That is, before being sent, data needs to be encapsulated, and the data is encapsulated into a preset VXLAN packet format and then sent. After receiving a VXLAN packet, a network intermediate device forwards the VXLAN packet according to an address in a corresponding header in the packet. In an exemplary embodiment, it may be represented that, before sending data, a virtual machine first needs to on encapsulate the data, and data that is not encapsulated cannot be directly sent; and correspondingly, received data is also encapsulated data, and after receiving data, the virtual machine needs to decapsulate the data.

In the following specific description, before sending data, a virtual machine needs to encapsulate a data packet that needs to be sent, and a received data packet is an encapsulated data packet. Therefore, received data needs to be decapsulated, and then next processing can be performed.

Figure 2:
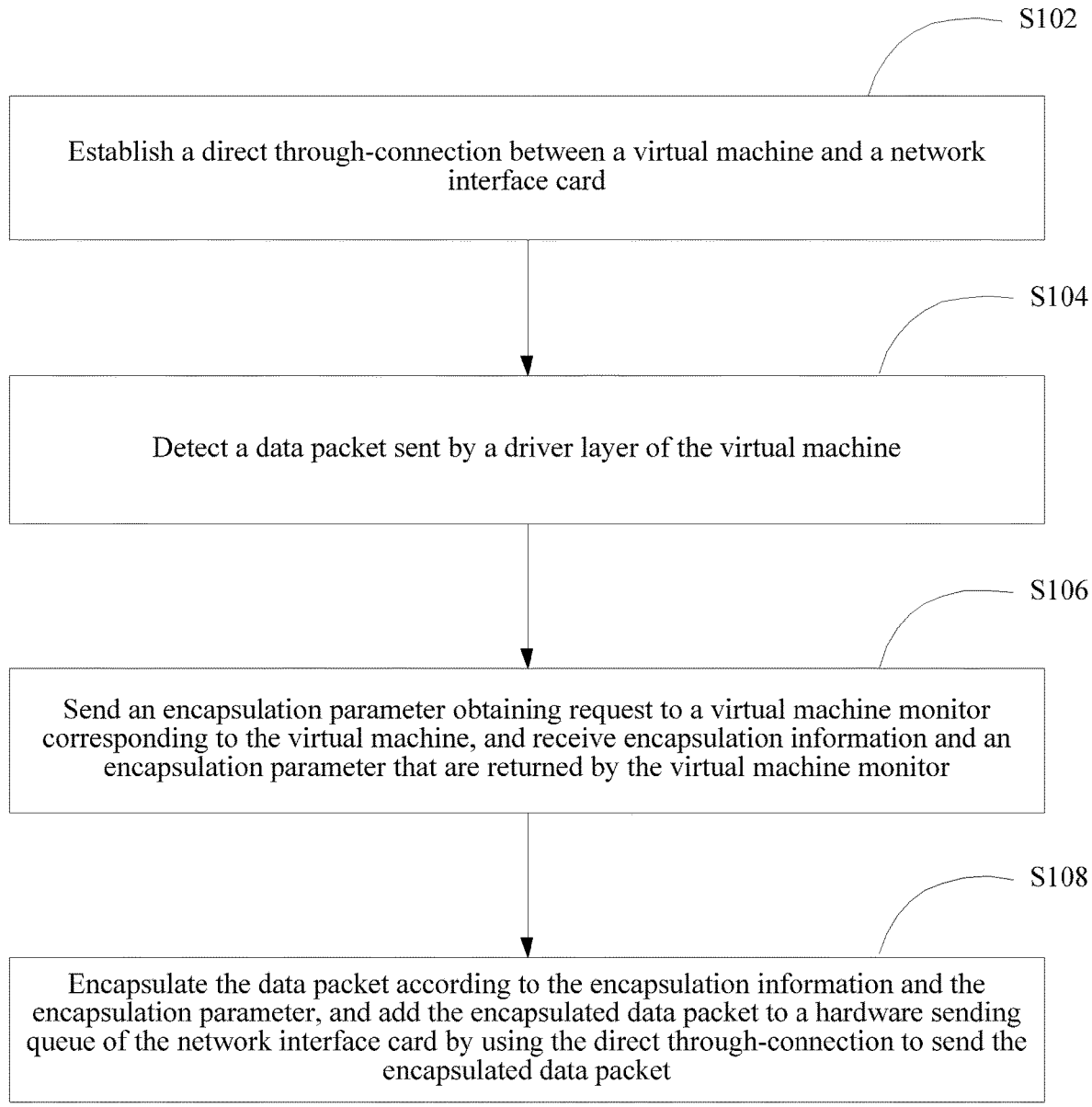
FIG. 2 is a schematic flowchart of a method for transmitting a data packet based on a virtual machine according to an embodiment.

FIG. 2 is a schematic flowchart of a method for transmitting a data packet based on a virtual machine according to an embodiment.

Optionally, as shown in FIG. 2, a method for sending a data packet based on a virtual machine includes the following operations S102 to S108:

Operation S102: Establish a direct through-connection between a virtual machine and a network interface card.

In the related art, a front-end network interface card driver installed a virtual machine can only indirectly access a physical network interface card on a host by using a back-end network interface card driver installed on the host. That is, the host and a plurality of virtual machines integrated on the host share the same physical network interface card, and the network interface card is managed by using a virtual machine controller and the network interface card driver of the host. That is, the network interface card driver installed on the virtual machine cannot directly access the physical network interface card on the host.

The direct through-connection in an exemplary embodiment may be such that the front-end network interface card driver (which may be briefly referred to as the front-end driver) of the virtual machine may directly perform data exchange with the physical network interface card, without requiring that data is first sent to the back-end network interface card driver (briefly referred to as the back-end driver) of the host side and then the back-end network interface card driver performs data processing and then forwards the data to the physical network interface card, thereby obviously reducing the quantity of modules through which the data needs to pass in the transmission process. Moreover, the data may be directly encapsulated and decapsulated by the front-end network interface card driver, and the back-end network interface card does not need to determine to perform repetitive data encapsulation and destination address mapping, thereby reducing unnecessary encapsulation and forwarding actions of the host side of the physical host, reducing CPU resources consumed when the back-end network interface card driver performs encapsulation, decapsulation and relay operations, reducing a CPU load ratio, and reducing a transmission delay caused by CPU resource shortage. Therefore, a limitation on an effective use rate of resources of the physical network interface card to the CPU is reduced.

In an exemplary embodiment, for a virtual machine, a direct through-connection between the virtual machine and a network interface card on the host is established, so that a driver layer of the virtual machine may directly access and use the network interface card without a need for relay or forwarding through a network interface card driver on the host. After the direct through-connection between the virtual machine and the network interface card is established, the driver layer of the virtual machine may directly send data or a data packet to the network interface card to which the direct through-connection is established, without a need for relay or forwarding through the driver of the host side.

For example, the virtual machine may include two data receiving/transmitting modes:

The first mode may be a direct mode. A direct through-connection is directly established between the virtual machine and the network interface card, the front-end network interface card driver of the virtual machine may directly access the network interface card, send a data packet to the network interface card and receive a data packet from the network interface card. In this case, receiving/transmitting of a data packet does not require the back-end network interface card driver to perform data encapsulation, decapsulation and relay.

The second mode may be an indirect mode. The virtual machine is connected to the network interface card by using the back-end network interface card driver of the host side, and data receiving/transmitting of the virtual machine requires the back-end network interface card driver to participate in data encapsulation, decapsulation and relay.

In the first mode, a network interface card on the whole or one or more ports on a network interface card need to be allocated to a virtual machine to which a direct through-connection is established. In this way, if data that the virtual machine currently receives/transmits needs to be encapsulated, an address of the network interface card or addresses of the network interface card and a corresponding port need to be carried in an encapsulation layer. After receiving the data carrying the address of the network interface card or the addresses of the network interface card and the corresponding port, the network interface card may directly send the data to the outside. After receiving the data, the network interface card detects, according to a port number of the received data and the virtual machine to which the network interface card is bound, the virtual machine to which the data needs to be directly sent, so that for the data packet of the virtual machine, data is received/transmitted without a need of being processed through the back-end network interface card driver.

In some embodiments, the method for transmitting a data packet based on a virtual machine further includes:

determining a data receiving/transmitting mode of one or more virtual machines according to a data receiving/transmitting situation of a virtual machine in a physical host or a computer node.

If the physical host or computer node includes a plurality of network interface cards, a plurality of virtual machines is disposed on the physical host or computer node, and a data receiving/transmitting mode of one or more virtual machines may be determined in various manners.

For example, the data receiving/transmitting mode may be determined in the following manner:

a data receiving/transmitting quantity of first virtual machines in a unit time is greater than a first threshold;

a data receiving/transmitting quantity of second virtual machines in the unit time is less than a second threshold;

the first threshold is greater than the second threshold, and a quantity of the first virtual machines is less than a quantity of network interface cards; and a data receiving/transmitting mode of the first virtual machines is determined as the first mode, and a direct through-connection between each first virtual machine and a network interface card is established; and/or, a data receiving/transmitting mode of the second virtual machines is determined as the second mode, and the second virtual machines share a network interface card to which a direct through-connection is currently not established to the first virtual machines to perform data receiving/transmitting.

The determining a data receiving/transmitting mode of the first virtual machines as the first mode and establishing a direct through-connection between each first virtual machine and a network interface card includes:

selecting, according to a data receiving/transmitting quantity of a single first virtual machine in the unit time and a bandwidth of the network interface cards, a network interface card that has a bandwidth matching the data receiving/transmitting quantity of the corresponding first virtual machine in the unit time, to establish a direct through-connection to the corresponding first virtual machine.

In another example, the data receiving/transmitting mode may be determined in the following manner:

a data receiving/transmitting quantity of first virtual machines in a unit time is greater than a first threshold;

a data receiving/transmitting quantity of second virtual machines in the unit time is less than a second threshold;

the first threshold is greater than the second threshold, and a quantity of the first virtual machines is not less than a quantity of network interface cards; and a data receiving/transmitting mode of the first virtual machines is determined as the first mode, and a direct through-connection between each first virtual machine and a first port of a network interface card is established; and/or, a data receiving/transmitting mode of the second virtual machines is determined as the second mode, and the second virtual machines share a second port to which a direct through-connection is currently not established to the first virtual machines to perform data receiving/transmitting.

The first port may include: one or more groups of ports, a group of ports include: a data sending port and a data receiving port, the data sending port may be configured by the virtual machine to send a data packet to an external device, and the data receiving port may be configured by the virtual machine to receive a data packet from an external device. The second port is different from the first port, and likewise may include: one or more groups of ports.

In some embodiments, the physical host or computer node correspondingly records identifiers of the first virtual machine and the network interface card or identifiers of the first virtual machine and the port of the network interface card according to the established direct through-connection.

In yet another example, the data receiving/transmitting mode may be determined in the following manner:

a type of data received/transmitted by the current virtual machine is determined;

if a data type of data exchanged between the first virtual machine and another device is a first type, a data receiving/transmitting mode of the first virtual machine is determined as the first mode; and/or if a data type of data exchanged between the second virtual machine and another device is a second type, a data receiving/transmitting mode of the second virtual machine is determined as the second mode.

The first type is different from the second type, and a transmission delay requirement of data of the first type is higher than that of data of the second type. Alternatively, quality of service (QoS) of data of the first type is higher than that of data of the second type.

In an exemplary embodiment, the direct through-connection may be based on a network interface card granularity or may be based on a port granularity. In an exemplary embodiment, for the direct through-connection based on a network interface card granularity, a virtual machine is usually bound to a network interface card, and establishes a direct through-connection to the bound network interface card.

Data packet encapsulation based on a network interface card granularity only needs to carry a MAC address and/or an IP address of the network interface card, and data packet receiving/transmitting between the network interface card and a virtual machine may be based on the MAC address and/or IP address of the network interface card.

If the direct through-connection is based on a port granularity, a virtual machine establishes a direct through-connection to a particular port of one or more network interface cards, and a network interface card may be configured to establish a direct through-connection to a plurality of virtual machines.

Data packet encapsulation based on a port granularity needs an address of a network interface card and further needs to carry a port number of a corresponding port.

In some embodiments, the physical host or a host of the computer node may set the data receiving/transmitting mode of the virtual machine.

In an exemplary embodiment, a network to which a direct through-connection is established with a virtual machine may be an independent physical network interface card. That is, when a plurality of virtual machines is integrated on the host, if each virtual machine needs to establish a direct through-connection between the virtual machine and a network interface card, each virtual machine needs to correspond to an independent network interface card device. For example, the physical host includes a plurality of physical network interface cards, and each virtual machine corresponds to a physical network interface card, and a direct through-connection between the virtual machine and the physical network interface card is established.

In another embodiment, a network to which a direct through-connection is established with a virtual machine may further be a section of physical address range on the physical network interface card, and this section of physical address range on the network interface card is mapped to a driver layer of the virtual machine. When sending data, the driver layer sends the data to the corresponding physical address range on the network interface card. In an exemplary embodiment, the driver layer of the virtual machine is a component of the front-end network interface card driver.

Optionally, the establishing a direct through-connection between a virtual machine and a network interface card further includes: allocating, within a physical address range corresponding to the network interface card, a target physical address range corresponding to the virtual machine to the virtual machine, and mapping the target physical address range to the driver layer of the virtual machine.

In an exemplary embodiment, the network interface card is an SR-IOV (Single Root I/O Virtualization) network interface card, and a target physical address range and a VF (Virtual Function) network interface card corresponding to the SR-IOV network interface card are allocated to the virtual machine.

Optionally, in an exemplary embodiment, the physical network interface card included in the host may further be an SR-IOV network interface card. That is, a PF (Physical Function) of the physical network interface card is extended to obtain several VFs, and each VF is presented in a form of an independent network interface card, has an independent PCI (Peripheral Component Interconnect) configuration area and a resource range, and may share a same physical resource (share a same physical network port) with another VF. That is, the plurality of VFs obtained by extending the single physical network interface card is deployed as optional network interface cards, each VF corresponds to a VF interface, each VF interface has an independent virtual PCIe channel (that is, PCI-Express channel, that is, a virtual machine corresponding to each VF independently communicates with an external I/O device), and these virtual PCIe channels share a PCIe channel of the physical network interface card.

Each virtual machine may occupy one or more VF interfaces. In this way, the virtual machine may directly access its own VF interface, that is, access its own virtual network interface card without a need for coordination and intervention of a VMM. In this case, the virtual machine establishes a direct through-connection to the network interface card, that is, equivalently establishes a direct through-connection to a VF interface of the physical network interface card, and the VF interface is used by the current virtual machine, may be used as a dedicated interface of the virtual machine, and is configured to rapidly receive/transmit data of the virtual machine.

Operation S104: Detect a data packet sent by a driver layer of the virtual machine.

When needing to send data to a network or another virtual machine or device, an application program or a system on the virtual machine sends a corresponding data packet to the driver layer of the virtual machine, and the data packet is optionally processed by the driver layer of the virtual machine. For example, the data packet is sent to the network interface card driver of the virtual machine and processed. In this operation, when the data packet sent by the driver layer of the virtual machine is detected, the sent data packet is obtained, and header information of the data packet is obtained. Optionally, in an exemplary embodiment, the header information may include a source address of the virtual machine, a source port of the virtual machine, a destination address/port and the like. Optionally, in an exemplary embodiment, the header information of the data packet may further include a protocol satisfying a requirement such as the TCP (Transmission Control Protocol). This is not limited in the disclosure.

Operation S106: Send an encapsulation parameter obtaining request to a virtual machine monitor corresponding to the virtual machine, and receive encapsulation information and an encapsulation parameter that are returned by the virtual machine monitor.

In an exemplary embodiment, encapsulation on the data packet sent by the virtual machine is completed by the virtual machine, but an optional operation and a corresponding parameter of the virtual machine in the process of performing encapsulation on the data packet are determined by the virtual machine monitor (VMM) on the host.

Optionally, in an exemplary embodiment, when a data packet is to be transmitted, a virtual machine requests, from the virtual machine monitor managing the virtual machine, a parameter request corresponding to the encapsulated data packet, that is, sends the encapsulation parameter obtaining request to the virtual machine monitor. After receiving the encapsulation parameter obtaining request sent by the virtual machine, the virtual machine monitor determines a corresponding encapsulation policy according to a virtual machine identifier included in the encapsulation parameter obtaining request and a data packet that is specifically to be sent, and returns data related to the encapsulation policy to the virtual machine, so that the virtual machine performs encapsulation on the data packet.

Optionally, in an exemplary embodiment, the related data of the encapsulation policy determined by the virtual machine monitor includes encapsulation information and an encapsulation parameter. Optionally, in an exemplary embodiment, the encapsulation information includes whether to perform encapsulation, and an encapsulation format that is used to perform encapsulation on the data packet; and the encapsulation parameter includes information for use in transmission of data, for example, a source IP address, a source Media Access Control (MAC) address, a destination IP address, and a destination MAC address, and further includes a protocol used by an encapsulation layer.

Data packet encapsulation based on a TCP/IP Internet Protocol stack is mainly divided into layered encapsulation of an application layer, a transport layer, a network layer and a link layer. After the layered encapsulation, data is encapsulated into a frame to be sent to a network interface card for transmission, and the encapsulation format may be a format of any one of the foregoing layers. For example, a format of the network layer (IP layer) is a GRE (Generic Routing Encapsulation) data packet format or a VXLAN (virtual Extensible LAN) data packet format.

Operation S108: Encapsulate the data packet according to the encapsulation information and the encapsulation parameter, and add the encapsulated data packet to a hardware sending queue of the network interface card by using the direct through-connection to send the encapsulated data packet.

After receiving the encapsulation information and the encapsulation parameter that are returned, the virtual machine may perform encapsulation on the data packet according to the encapsulation information and the encapsulation parameter.

Optionally, in an exemplary embodiment, when the encapsulation information indicates that the data packet that is currently to be sent does not need to be encapsulated, encapsulation on the data packet may be completed as long as the corresponding encapsulation parameter is added to the header information of the data packet. In another embodiment, if the encapsulation information indicates that the data packet needs to be encapsulated, and the data packet that is currently to be sent is encapsulated by using the GRE data packet format, the data packet is encapsulated according to the GRE data packet format, and the corresponding encapsulation parameter is encapsulated in layered encapsulation corresponding to the data packet.

After the virtual machine encapsulates the to-be-sent data packet, the encapsulated data packet is sent to the network interface card by using the direct through-connection between the virtual machine and the network interface card and is optionally sent by the network interface card. For example, the encapsulated data packet is added to the hardware sending queue of the network interface card by using the direct through-connection between the virtual machine and the network interface card, and the network interface card sends data or data packets in the hardware sending queue one by one.

In an exemplary embodiment, if the direct through-connection between the virtual machine and the network interface card is established by allocating, within a physical address range corresponding to the network interface card, a target physical address range corresponding to the virtual machine to the virtual machine and mapping the target physical address range to the driver layer of the virtual machine, the data is sent to the hardware sending queue corresponding to the target physical address range on the network interface card when the data is added to the hardware sending queue of the network interface card. In an exemplary embodiment, the adding the encapsulated data packet to a hardware sending queue of the network interface card by using the direct through-connection to send the encapsulated data packet further includes: sending the encapsulated data packet to a hardware sending queue corresponding to the target physical address range on the network interface card to send the encapsulated data packet.

The method for sending a data packet based on a virtual machine is applied to a network device, and the network device includes: at least one network interface card and at least one processor connected to the network interface card.

The network device includes one or more network interface cards, and one or more processors.

The network interface card is connected to the processor by using a bus, for example, by using an integrated circuit bus.

The processor may be: a central processing unit, a microprocessor, a digital signal processor, an application processor, a programmable array, an application-specific integrated circuit or the like.

The processor may run an operating system, a software application or computer executable code such as a computer program, and can set one or more virtual machines. A storage such as a memory is further disposed in the network device, and the network device may be connected to the processor by using a bus. The network interface card may be used by the virtual machine to send data by using the first mode and/or the second mode.

Figure 3:
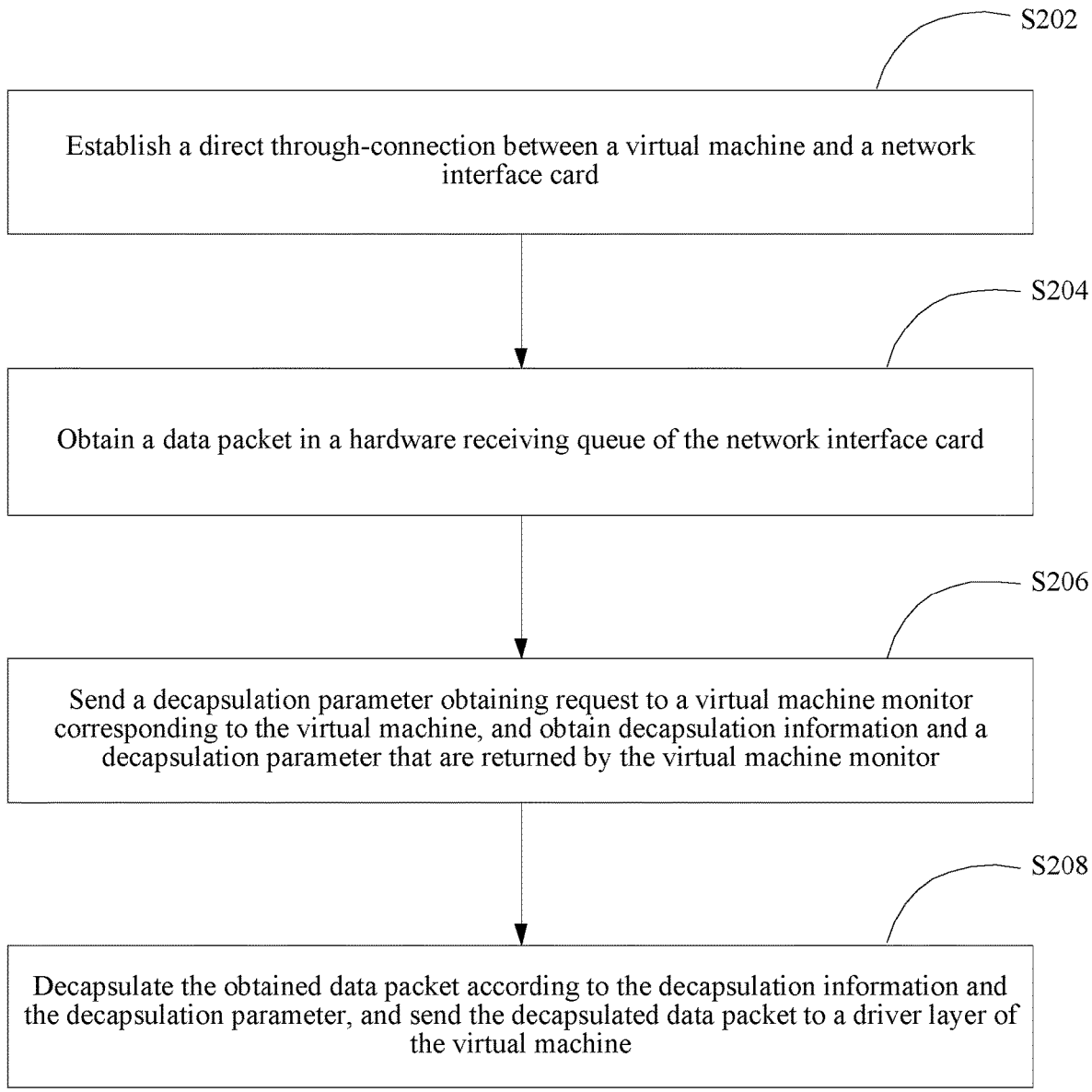
FIG. 3 is a schematic flowchart of a method for receiving a data packet based on a virtual machine according to an embodiment.

FIG. 3 shows a method for receiving a data packet based on a virtual machine according to an exemplary embodiment. In an exemplary embodiment, the method includes the following operations S202 to S208:

Operation S202: Establish a direct through-connection between a virtual machine and a network interface card. For a related operation, refer to operation S102.

Operation S204: Obtain a data packet in a hardware receiving queue of the network interface card.

In an exemplary embodiment, when another virtual machine or another device, or a server sends data to the current virtual machine, the data is sent to a network interface card to which a direct through-connection is established with the virtual machine, and then the network interface card sends the data to a driver layer of the virtual machine. In an exemplary embodiment, when a data packet sent to an IP address or a MAC address corresponding to the current virtual machine exists, the data packet is sent to the hardware receiving queue of the network interface card, and the network interface card receives and processes data packets in the hardware receiving queue one by one.

In an exemplary embodiment, when a data packet exists in the hardware receiving queue of the network interface card, the data packet is obtained. It should be noted that, in an exemplary embodiment, the data packet obtained in the hardware receiving queue of the network interface card is an encapsulated data packet. That is, the virtual machine needs to perform a decapsulation operation on the received encapsulated data packet.

In an exemplary embodiment, if the direct through-connection between the virtual machine and the network interface card is established by allocating, within a physical address range corresponding to the network interface card, a target physical address range corresponding to the virtual machine to the virtual machine and mapping the target physical address range to the driver layer of the virtual machine, the data packet in the hardware receiving queue of the network interface card is obtained from the hardware receiving queue corresponding to the target physical address range that is on the network interface card and that is allocated to the virtual machine. In an exemplary embodiment, the obtaining a data packet in a hardware receiving queue of the network interface card further includes: obtaining a data packet in a hardware receiving queue corresponding to the target physical address range on the network interface card.

Operation S206: Send a decapsulation parameter obtaining request to a virtual machine monitor corresponding to the virtual machine, and obtain decapsulation information and a decapsulation parameter that are returned by the virtual machine monitor.

In an exemplary embodiment, a specific operation of decapsulating the data packet received by the virtual machine is completed by the virtual machine, but an optional operation and a corresponding parameter of the virtual machine in the process of performing decapsulation on the data packet are determined by the virtual machine monitor (VMM) on the host.

Optionally, in an exemplary embodiment, when the data packet is received in the network interface card receiving queue of the virtual machine, the virtual machine requests, from the virtual machine monitor managing the virtual machine, a parameter request corresponding to the decapsulated data packet, that is, sends the decapsulation parameter obtaining request to the virtual machine monitor. After receiving the decapsulation parameter obtaining request sent by the virtual machine, the virtual machine monitor determines a corresponding decapsulation policy according to a virtual machine identifier included in the decapsulation parameter obtaining request and a specific received data packet, and returns data related to the decapsulation policy to the virtual machine, so that the virtual machine performs decapsulation on the data packet.

Optionally, in an exemplary embodiment, the related data of the decapsulation policy determined by the virtual machine monitor includes decapsulation information and a decapsulation parameter. Optionally, the decapsulation information includes an encapsulation format that is used to perform decapsulation on the data packet; and the decapsulation parameter includes information to be used for performing decapsulation on the received encapsulated data, for example, a source IP address, a source MAC address, a destination IP address, and a destination MAC address, and further includes a protocol used by an encapsulation layer.

Operation S208: Decapsulate the obtained data packet according to the decapsulation information and the decapsulation parameter, and send the decapsulated data packet to a driver layer of the virtual machine.

After receiving the decapsulation information and the decapsulation parameter that are returned, the virtual machine may perform decapsulation on the data packet according to the decapsulation information and the decapsulation parameter. For the decapsulated data packet, the data packet may be sent by the network interface card to the driver layer of the virtual machine, that is, the network interface card driver, and then the driver layer sends the data packet to a corresponding application layer for performing optional processing.

The method for sending a data packet based on a virtual machine is applied to a network device, and the network device includes: at least one network interface card and at least one processor connected to the network interface card.

The network device includes one or more network interface cards, and one or more processors.

The network interface card is connected to the processor by using a bus, for example, by using an integrated circuit bus.

The processor may be: a central processing unit, a microprocessor, a digital signal processor, an application processor, a programmable array, an application-specific integrated circuit or the like.

The processor may run an operating system, a software application or computer executable code such as a computer program, and can set one or more virtual machines. A storage such as a memory is further disposed in the network device, and the network device may be connected to the processor by using a bus. The network interface card may be used by the virtual machine to receive data by using the first mode and/or the second mode.

Figure 4:
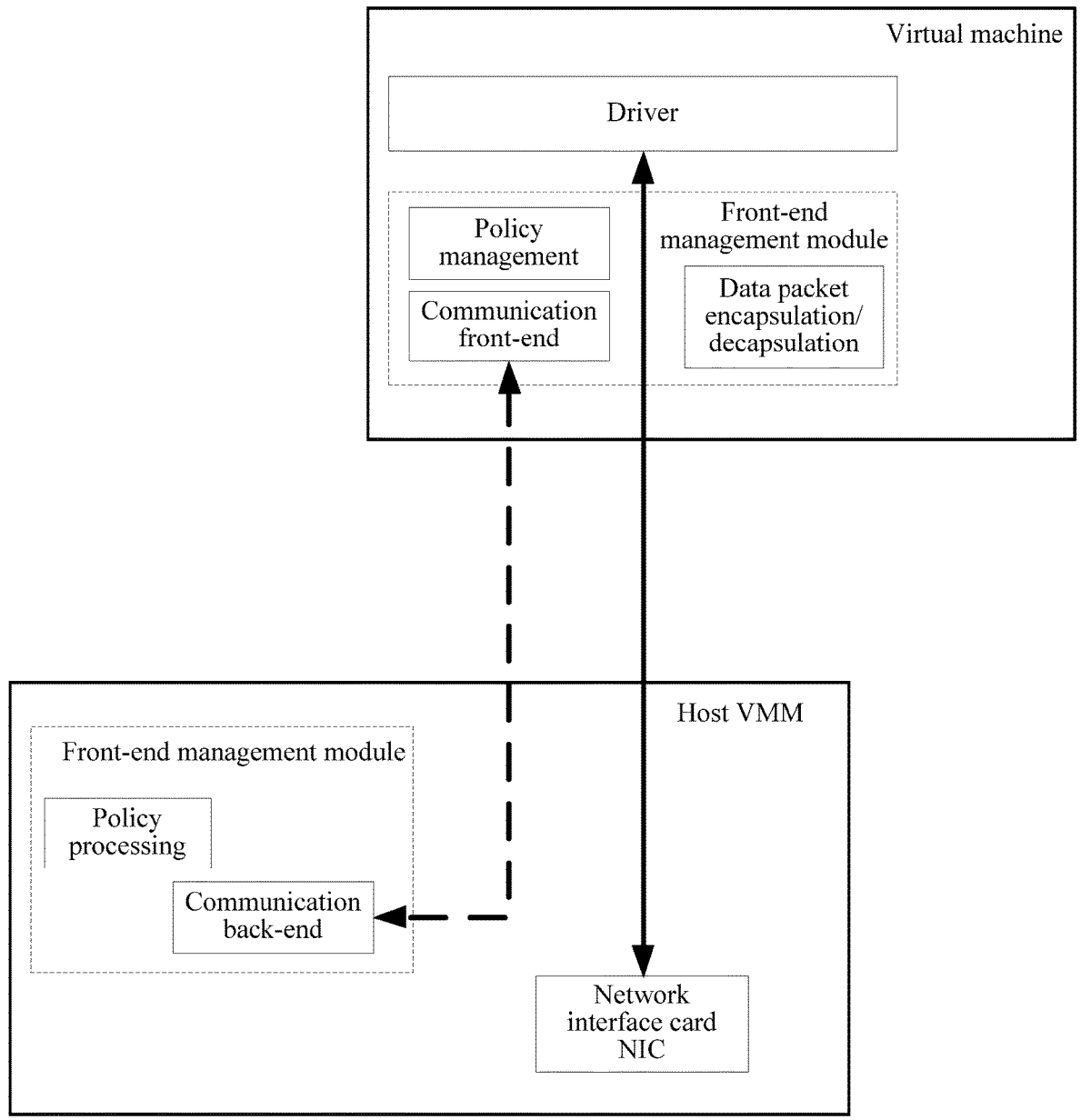
FIG. 4 is a diagram of a logical structure based on a virtual machine and a host according to an embodiment.

FIG. 4 provides an architectural diagram of a system for sending and receiving a data packet based on a virtual machine. In an exemplary embodiment, a host includes a virtual machine, and further includes a virtual machine monitor (VMM) managing the virtual machine, and the host includes a physical network interface card. A network interface card driver corresponding to the network interface card is installed on the virtual machine, and the virtual machine directly communicates with the network interface card on the host by using the network interface card driver.

Optionally, in an exemplary embodiment, the virtual machine includes a front-end management module, and specifically includes three sub-modules: a policy management sub-module, a communication front-end sub-module, and a data packet encapsulation/decapsulation sub-module. It should be noted that the front-end management module is placed below the network interface card driver of the virtual machine. That is, when the network interface card driver is about to send a data packet to a hardware sending queue of the network interface card and receive a data packet from a hardware receiving queue, the data packet is taken out, sent to the front-end management module for encapsulation or decapsulation, and then sent to the network interface card or a driver layer of the network interface card. The host side includes a back-end management module, configured to process a request sent by the virtual machine and give a response to the request, for example, parse an encapsulation parameter obtaining request or a decapsulation parameter obtaining request sent by the virtual machine side and give a corresponding answer.

That is, a control plane and a data plane in a process of sending and receiving a data packet based on a virtual machine are separated, encapsulation and decapsulation on the data packet are completed on the virtual machine side, and optionally an encapsulation policy and a decapsulation policy are still completed by the host side.

Moreover, to solve the technical problem in the existing technology that effective utilization of system resources is not achieved in sending a data packet based on a virtual machine, the exemplary embodiments further provide an apparatus for sending a data packet based on a virtual machine and an apparatus for receiving a data packet based on a virtual machine.

Figure 5:
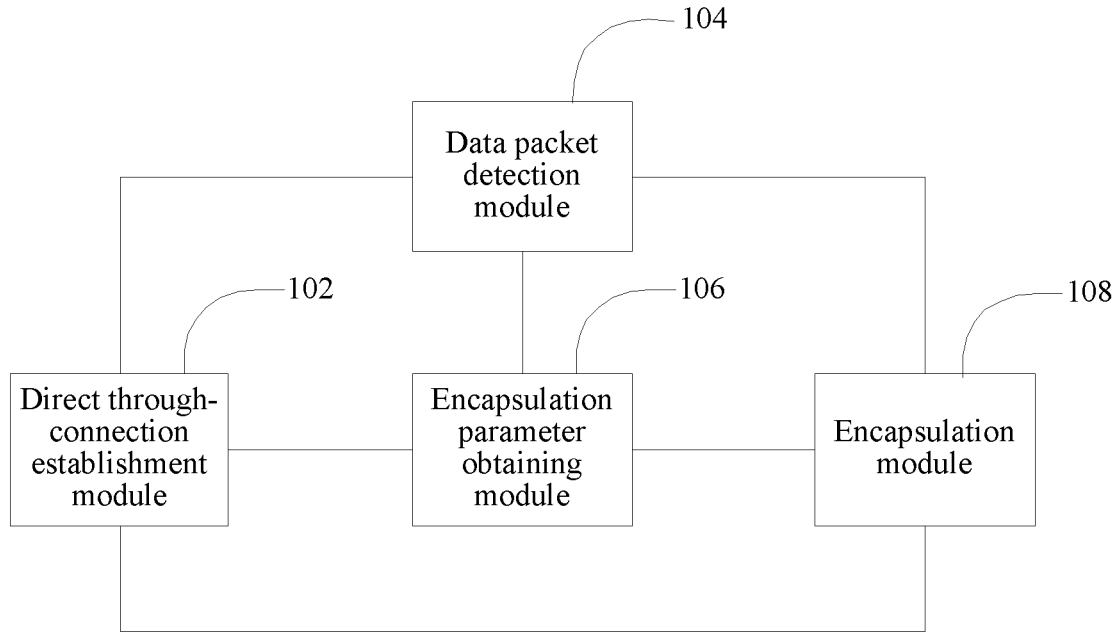
FIG. 5 is a schematic structural diagram of an apparatus for transmitting a data packet based on a virtual machine according to an embodiment.

Optionally, in an exemplary embodiment, as shown in FIG. 5, the apparatus for sending a data packet based on a virtual machine according to an exemplary embodiment includes a direct through-connection establishment module 102, a data packet detection module 104, an encapsulation parameter obtaining module 106, and an encapsulation module 108, where:

the direct through-connection establishment module 102 is configured to establish a direct through-connection between a virtual machine and a network interface card;

the data packet detection module 104 is configured to detect a data packet sent by a driver layer of the virtual machine;

the encapsulation parameter obtaining module 106 is configured to send an encapsulation parameter obtaining request to a virtual machine monitor corresponding to the virtual machine, and receive encapsulation information and an encapsulation parameter that are returned by the virtual machine monitor; and the encapsulation module 108 is configured to encapsulate the data packet according to the encapsulation information and the encapsulation parameter, and add the encapsulated data packet to a hardware sending queue of the network interface card by using the direct through-connection to send the encapsulated data packet.

Optionally, in an embodiment, the encapsulation information includes an encapsulation format, and the encapsulation format includes an encapsulation protocol of a data packet encapsulation layer.

Optionally, in an embodiment, the encapsulation parameter includes an IP address and/or a MAC address of a data packet encapsulation layer.

Optionally, in an embodiment, the direct through-connection establishment module 102 is further configured to allocate, within a physical address range corresponding to the network interface card, a target physical address range corresponding to the virtual machine to the virtual machine, and map the target physical address range to the driver layer of the virtual machine.

Optionally, in an embodiment, the encapsulation module 108 is further configured to send the encapsulated data packet to a hardware sending queue corresponding to the target physical address range on the network interface card to send the encapsulated data packet.

Figure 6:
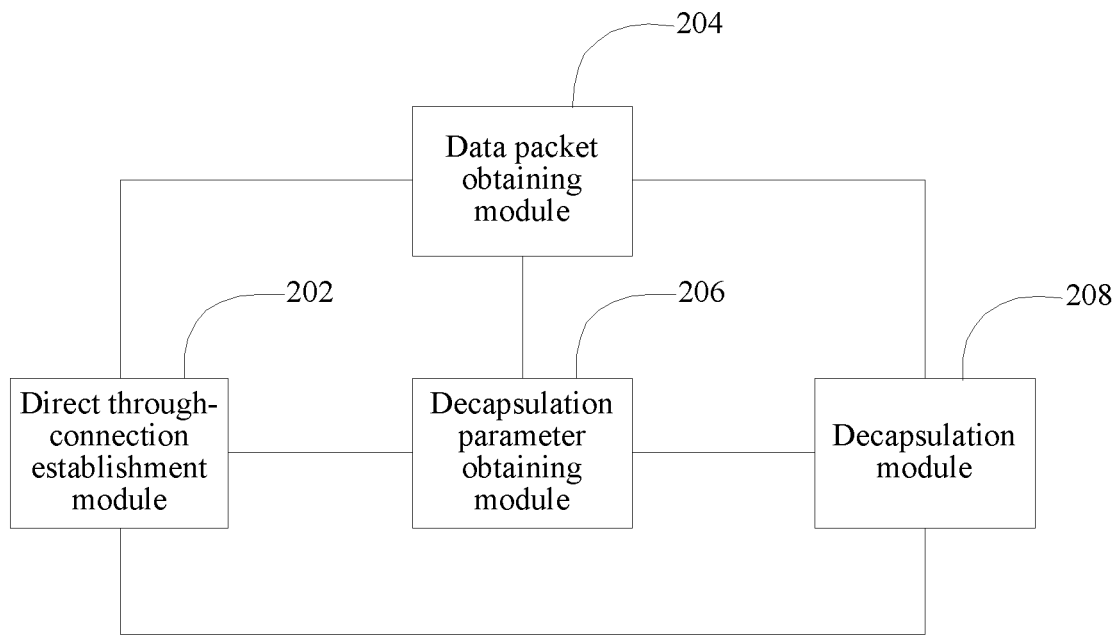
FIG. 6 is a schematic structural diagram of an apparatus for receiving a data packet based on a virtual machine according to an embodiment.

FIG. 6 shows specific structural composition of an apparatus for receiving a data packet based on a virtual machine according to an exemplary embodiment. As shown in FIG. 6, the apparatus includes a direct through-connection establishment module 202, a data packet obtaining module 204, a decapsulation parameter obtaining module 206, and a decapsulation module 208, where:

the direct through-connection establishment module 202 is configured to establish a direct through-connection between a virtual machine and a network interface card;

the data packet obtaining module 204 is configured to obtain a data packet in a hardware receiving queue of the network interface card;

the decapsulation parameter obtaining module 206 is configured to send a decapsulation parameter obtaining request to a virtual machine monitor corresponding to the virtual machine, and obtain decapsulation information and a decapsulation parameter that are returned by the virtual machine monitor; and the decapsulation module 208 is configured to decapsulate the obtained data packet according to the decapsulation information and the decapsulation parameter, and send the decapsulated data packet to a driver layer of the virtual machine.

Optionally, in an embodiment, the decapsulation information includes an encapsulation format, and the encapsulation format includes an encapsulation protocol of a data packet encapsulation layer.

Optionally, in an embodiment, the decapsulation parameter includes an IP address and/or a MAC address of a data packet encapsulation layer.

Optionally, in an embodiment, the direct through-connection establishment module 202 is further configured to allocate, within a physical address range corresponding to the network interface card, a target physical address range corresponding to the virtual machine to the virtual machine, and map the target physical address range to the driver layer of the virtual machine.

Optionally, in an embodiment, the decapsulation module 208 is further configured to obtain a data packet in a hardware receiving queue corresponding to the target physical address range on the network interface card.

After the method and apparatus for sending data based on a virtual machine and the method and apparatus for receiving data based on a virtual machine according to exemplary embodiments are used, a virtual machine on a physical host establishes a direct through-connection between the virtual machine and a network interface card, the virtual machine directly sends and receives data by using the direct through-connection between the virtual machine and the network interface card, and data does not need to be relayed through a network interface card driver on the host.

Moreover, in a process of sending data, virtual machine needs to request, from a virtual machine monitor on the host, a data packet encapsulation parameter corresponding to the data that needs to be sent, then encapsulates, according to the encapsulation parameter provided by the virtual machine monitor on the host, data that needs to be encapsulated, and then sends the encapsulated data to the network interface card for sending; and when the network interface card in the direct through-connection to the virtual machine receives the encapsulated data, the network interface card also needs to request a decapsulation parameter from the virtual machine monitor on the host after, then can decapsulate the received data according to the decapsulation parameter provided by the virtual machine monitor, and then can send the data to a driver layer of the virtual machine. That is, after the direct through-connection between the virtual machine side and the network interface card is established, the virtual machine side may complete encapsulation and decapsulation on the data packet, but a policy for the virtual machine side to encapsulate and decapsulate the data packet is still completed by the host side. That is, a control plane and a data plane for receiving/transmitting the data packet are separated, and sending and receiving of data thereof are transparent for the virtual machine. For the physical host, in a process in which the virtual machine sends or receives a data packet, the network interface card driver of the host side does not need to perform a plurality of times of data transmission and data packet encapsulation and decapsulation, to reduce occupancy for a system resource, particularly, a CPU resource.

Figure 7:
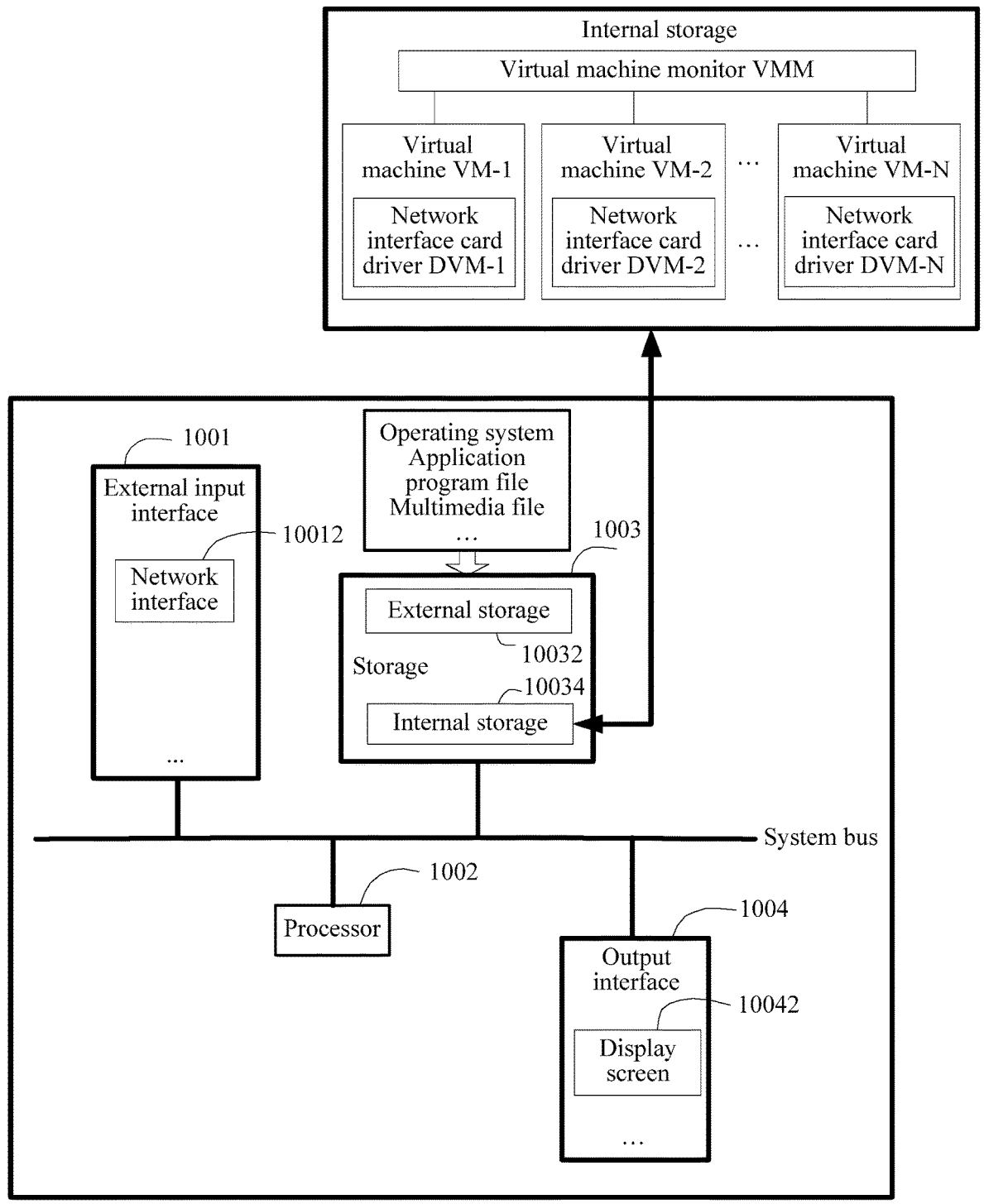
FIG. 7 is a schematic structural diagram of a computer device running the foregoing method for transmitting a data packet based on a virtual machine and method for receiving a data packet based on a virtual machine according to an embodiment.

FIG. 7 shows a terminal of a computer system that is based on the Von Neumann architecture and that runs the methods for sending and receiving a data packet based on a virtual machine according to exemplary embodiments.

The computer system according to an exemplary embodiment of FIG. 7 may include, for example but not limited to, a terminal device such as a smartphone, a tablet computer, a palmtop computer, a notebook computer or a personal computer. In an exemplary embodiment, the computer system may include an external input interface 1001, a processor 1002, a storage 1003 and an output interface 1004 that are connected by using a system bus. In an exemplary embodiment, the external input interface 1001 may include at least an network interface 10012. The storage 1003 may include an external storage 10032 (for example a hard disk, an optical disk or a floppy disk) and an internal storage 10034, the internal storage 10034 includes a virtual machine monitor VMM and N virtual machines VM-1, VM-2, . . . , and VM-N, and all the virtual machines correspondingly have network interface card drivers DVM-1, DVM-2, . . . , and DVM-N corresponding to the virtual machines. The output interface 1004 may include at least a device such as a display screen 10042.

The method according to an exemplary embodiment may be run based on a computer program, and a program file of the computer program is stored in the external storage 10032 of the computer system based on the Von Neumann architecture. When being run, the program file is loaded into the internal storage 10034, and then compiled into machine code to be later transferred to the processor 1002 for execution, so that in the computer system based on the Von Neumann architecture, the direct through-connection establishment module 102, the data packet detection module 104, the encapsulation parameter obtaining module 106, the encapsulation module 108, the direct through-connection establishment module 202, the data packet obtaining module 204, the decapsulation parameter obtaining module 206, and the decapsulation module 208 are formed logically. Moreover, in the process of performing the methods for sending and/or receiving a data packet based on a virtual machine according to exemplary embodiments, each input parameter is received by using the external input interface 1001, transferred to the storage 1003 for buffering, and then input to the processor 1002 for processing, and processing result data is buffered in the storage 1003 for subsequent processing or transferred to the output interface 1004 for output.

An exemplary embodiment provides a computer storage medium, the computer storage medium storing computer executable code, and after being executed, the computer executable code being capable of implementing the method for sending a data packet based on a virtual machine provided in the one or more technical solutions according to the disclosure, or implementing the method for receiving a data packet based on a virtual machine provided in the one or more technical solutions according to the disclosure.

The computer storage medium may be any computer storage medium such as, for example but not limited to, a random storage medium, a read-only storage medium, a flash memory, a mobile hard disk, an optical disk or a magnetic tape, and is In an exemplary embodiment a non-transient storage medium.

The computer executable code on the computer storage medium may include: a computer program or an application program, and after being executed, the computer executable code may implement the method shown in FIG. 2 and/or FIG. 3.

In the exemplary embodiments, a virtual machine may directly establish a direct through-connection between the virtual machine and a network interface card, and the virtual machine may exchange data with an external device by using the direct through-connection. In this way, data does not need to undergo operations such as relay, encapsulation and decapsulation of a back-end network interface card driver of a host side, thereby reducing CPU resources, memory resources or the like occupied by the host side to perform data relay processing, reducing CPU consumption, reducing a delay of data receiving/transmitting caused by processing of the back-end network interface card driver, reducing a phenomenon that an effective use rate of resources is low because the network interface card is limited by the CPU or memory resources, improving a data receiving/transmitting speed and an effective use rate of the network interface card, and having a positive industrial effect. Moreover, by changing a program of the virtual machine, the technical solutions provided in the embodiments are implemented simply and conveniently. Therefore, the disclosure is characterized by strong industrial implementability and a large industrial propagable range.

It should be understood that the disclosure is not limited to the precise structures described above and shown in the accompanying drawings, and various modifications and changes can be made without departing from the scope of the disclosure. The scope of the disclosure is limited only by the appended claims.

What is claimed is:

1. A method for transmitting a data packet based on a virtual machine, the method comprising:
    establishing, with respect to a virtual machine disposed on a physical host including at least one processor, a direct through-connection between the virtual machine and a network interface card included in the physical host;
    detecting, by the virtual machine, the data packet transmitted by a driver layer of the virtual machine;
    transmitting, by the virtual machine, an encapsulation parameter obtaining request to a virtual machine monitor corresponding to the virtual machine on the physical host, and receiving encapsulation information and an encapsulation parameter in response to the encapsulation parameter obtaining request; and
    encapsulating, by the virtual machine, the data packet according to the encapsulation information and the encapsulation parameter, and adding the encapsulated data packet to a hardware transmitting queue of the network interface card by using the direct through-connection, without a relay through a network interface card driver of the physical host, to transmit the encapsulated data packet.

2. The method according to claim 1, wherein the encapsulation information comprises an encapsulation format, the encapsulation format comprising an encapsulation protocol of a data packet encapsulation layer.

3. The method according to claim 1, wherein the encapsulation parameter comprises at least one of an Internet Protocol IP address or a Media Access Control MAC address of a data packet encapsulation layer.

4. The method according to claim 1, wherein the establishing comprises:
    allocating to the virtual machine, within a physical address range corresponding to the network interface card, a target physical address range corresponding to the virtual machine, and mapping the target physical address range to the driver layer of the virtual machine.

5. The method according to claim 4, wherein the adding the encapsulated data packet to the hardware transmitting queue comprises:
    transmitting the encapsulated data packet to the hardware transmitting queue corresponding to the target physical address range on the network interface card to transmit the encapsulated data packet.

6. The method according to claim 1, wherein the method is applied to a network device, the network device comprising at least one network interface card and the at least one processor connected to the at least one network interface card.

7. An apparatus for transmitting a data packet based on a virtual machine, the apparatus comprising:
at least one memory configured to store program code; and
at least one processor configured to access the at least one memory and operate according to the program code, the program code comprising:
direct through-connection establishment code configured to cause the at least one processor to, with respect to a virtual machine disposed on a physical host, establish a direct through-connection between the virtual machine and a network interface card included in the physical host;
data packet detection code configured to cause the at least one processor to detect the data packet sent by a driver layer of the virtual machine;
encapsulation parameter obtaining code configured to cause the at least one processor to transmit an encapsulation parameter obtaining request to a virtual machine monitor corresponding to the virtual machine on the physical host, and receive encapsulation information and an encapsulation parameter in response to the encapsulation parameter obtaining request; and
encapsulation code configured to cause the at least one processor to encapsulate the data packet according to the encapsulation information and the encapsulation parameter, and add the encapsulated data packet to a hardware transmitting queue of the network interface card by using the direct through-connection, without a relay through a network interface card driver of the physical host, to transmit the encapsulated data packet.

8. The apparatus according to claim 7, wherein the encapsulation information comprises an encapsulation format, the encapsulation format comprising an encapsulation protocol of a data packet encapsulation layer, and
wherein the encapsulation parameter comprises at least one of an IP address or a MAC address of the data packet encapsulation layer.

9. The apparatus according to claim 7, wherein the direct through-connection establishment code further causes the at least one processor to allocate to the virtual machine, within a physical address range corresponding to the network interface card, a target physical address range corresponding to the virtual machine, and map the target physical address range to the driver layer of the virtual machine, and
the encapsulation code further causes the at least one processor to transmit the encapsulated data packet to the hardware transmitting queue corresponding to the target physical address range on the network interface card to transmit the encapsulated data packet.

10. A method for receiving a data packet based on a virtual machine, comprising:
establishing, with respect to a virtual machine disposed on a physical host including at least one processor, a direct through-connection between the virtual machine and a network interface card included the physical host;
obtaining, by the virtual machine, the data packet in a hardware receiving queue of the network interface card, without a relay through a network interface card driver on the physical host;
transmitting, by the virtual machine, a decapsulation parameter obtaining request to a virtual machine monitor corresponding to the virtual machine on the physical host, and obtaining decapsulation information and a decapsulation parameter in response to the decapsulation parameter obtaining request; and
decapsulating, by the virtual machine, the obtained data packet according to the decapsulation information and the decapsulation parameter, and transmitting the decapsulated data packet to a driver layer of the virtual machine,
wherein the decapsulation information comprises an encapsulation format, the encapsulation format comprising an encapsulation protocol of a data packet encapsulation layer, and
wherein the decapsulation parameter comprises at least one of an IP address or a MAC address of a data packet encapsulation layer.

11. The method according to claim 10, wherein the establishing comprises:
allocating to the virtual machine, within a physical address range corresponding to the network interface card, a target physical address range corresponding to the virtual machine, and mapping the target physical address range to the driver layer of the virtual machine.

12. The method according to claim 11, wherein the obtaining the data packet comprises:
obtaining the data packet in the hardware receiving queue corresponding to the target physical address range on the network interface card.

13. The method according to claim 10, wherein the method is applied to a network device, the network device comprising at least one network interface card and the at least one processor connected to the at least one network interface card.

14. An apparatus for receiving a data packet based on a virtual machine, the apparatus comprising at least one memory configured to store program code, and at least one processor configured to access the at least one memory and operate according to the program code,
wherein the program code, when executed by the at least one processor, causes the at least one processor to perform the method of claim 10.

15. The apparatus according to claim 14, wherein the program code causes the at least one processor to allocate to the virtual machine, within a physical address range corresponding to the network interface card, a target physical address range corresponding to the virtual machine, and map the target physical address range to the driver layer of the virtual machine, and
wherein the program code causes the at least one processor to obtain a data packet in the hardware receiving queue corresponding to the target physical address range on the network interface card.

16. A non-transitory computer storage medium storing computer executable code, which, when executed by a computer, causes the computer to implement the method of claim 1.

17. A non-transitory computer storage medium storing computer executable code, which, when executed by a computer, causes the computer to implement the method of claim 10.

* * * * *